L. P. FAUGHT.
Machines for Pressing Bell-Crowned Hats.
No. 128,293.
Patented June 25, 1872.
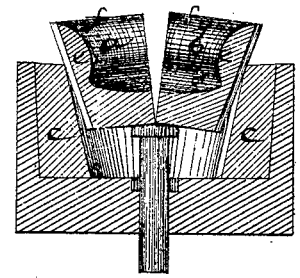
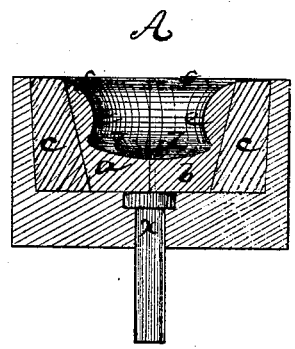
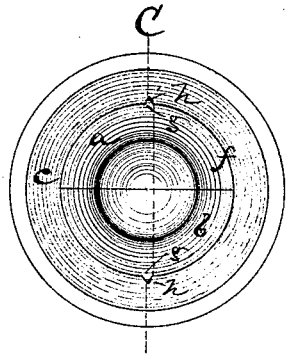
Witnesses.
M. W. Frothingham
L. H. Latimer.
Inventor
Lemuel P. Faught,
By his Attys.
Crosby & Gould

UNITED STATES PATENT OFFICE.

LEMUEL P. FAUGHT, OF FOXBOROUGH, MASSACHUSETTS.

IMPROVEMENT IN MACHINES FOR PRESSING BELL-CROWNED HATS.

Specification forming part of Letters Patent No. 128,293, dated June 25, 1872.

*To all whom it may concern:*

Be it known that I, LEMUEL P. FAUGHT, of Foxborough, in the county of Norfolk and State of Massachusetts, have invented an Improvement in Molds for Forming or Pressing Bell-Crowns of Hats; and I do hereby declare that the following, taken in connection with the drawing which accompanies and forms part of this specification, is a description of my invention sufficient to enable those skilled in the art to practice it.

In the manufacture of hats, especially those made of straw, it is customary, to a greater or less extent, to form, press, or shape the crowns in molds, or hollow dies, or matrices, the surfaces of which are of the shape to be given to the crown, the hat-crown being introduced into such a mold and expanded against the die-surface by means of a hydraulic press. Such a mold is generally formed with a die-surface which is either cylindrical in shape, or else smallest at the bottom and regularly increasing in size to the mouth. From such dies the crowns are removed without difficulty.

In some styles of hats, however, the crown is larger at the top than immediately below, or the hat is made bell-crowned; and as the die has to be made large at bottom to receive and shape such a crown, it is with difficulty that the crown is forced into the mold, while to remove it from the mold without injury after it is shaped and pressed is almost impossible.

The object of my invention is to provide an easy means for the removal of the crown from the mold without injury.

The drawing represents a sectional die or mold constructed in accordance with or to practice my invention.

A shows the mold in cross-section. B shows the open mold. C is a plan of the mold.

The mold is shown as made in two parts or halves, $a\ b$, set in a solid circular case, $c$; the mold being preferably made, as to its external shape, as a frustum of a cone and fitting into a recess in the case, which recess corresponds in form to the outer surface of the mold, so that when the parts of the mold are together within the case the mold is practically a solid mold. The bottom $d\ d$ of the mold or matrix space is made larger than the part $e\ e$ above it; and to open the mold to receive a hat-crown the halves $a\ b$ are raised together, and when raised they can separate, as seen at B, the hat being then readily placed in position or removed from the mold after pressure. To raise and open the mold, it is made to rest at bottom either directly upon or just above the top of a lifter-pin, $x$. When the pin is raised the two halves of the mold are raised, and as they rise they fall apart, thereby opening the mold and permitting the hat to be placed in the mold, or one that has been pressed to be removed from the mold. The two parts of the mold may be hinged together at the bottom by a hinge-joint that permits the parts to open; and the mold may be made in more than two parts, although I prefer the two-part mold.

The rim of the hat is formed on the curved surface $f$, and may extend beyond said surface, and be formed with any suitable roll.

Guide-tongues $g$ and recesses $h$ may be used to guide and position the two parts of the mold.

I claim—

In combination with the sectional die, the lifter $x$ under the die, by raising which lifter the die-sections are raised, and open as they rise, substantially as described.

LEMUEL P. FAUGHT.

Witnesses:
FRANCIS GOULD,
M. W. FROTHINGHAM.